July 6, 1937. E. C. DAMROW 2,086,353
METHOD AND APPARATUS FOR FORKING CURD
Filed May 14, 1935 2 Sheets-Sheet 1
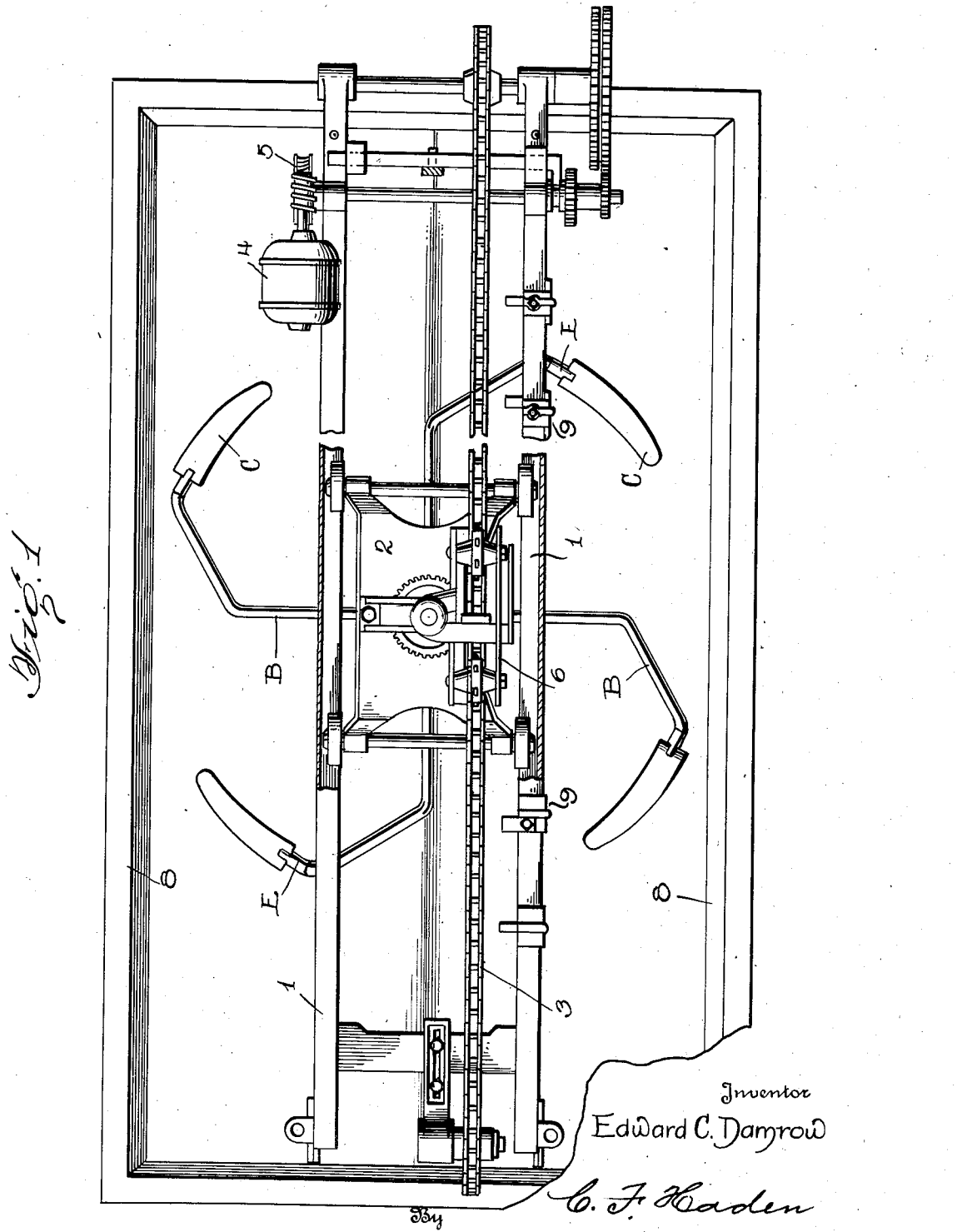
Inventor
Edward C. Damrow
By C. F. Haden
Attorney July 6, 1937.  E. C. DAMROW  2,086,353
METHOD AND APPARATUS FOR FORKING CURD
Filed May 14, 1935   2 Sheets-Sheet 2
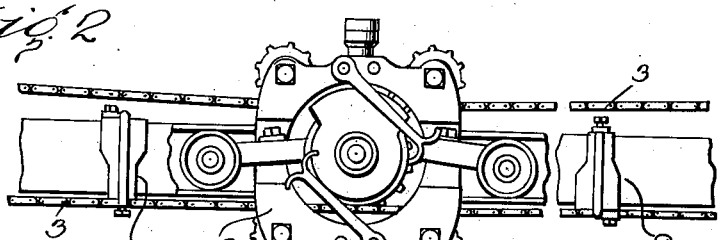
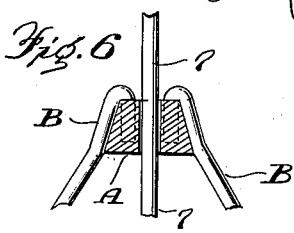
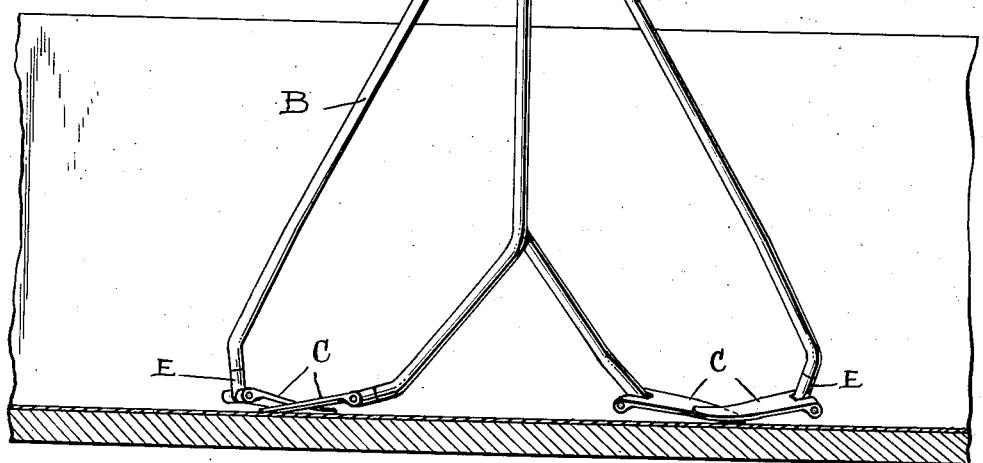
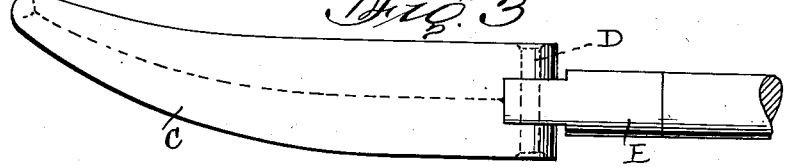
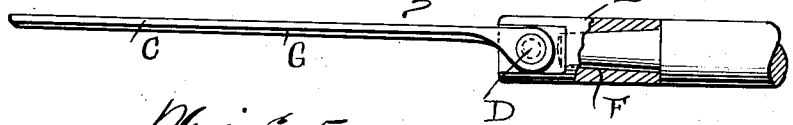
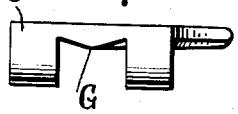
Inventor
Edward C. Damrow
C. F. Haden
By
Attorney Patented July 6, 1937

2,086,353

UNITED STATES PATENT OFFICE 2,086,353

METHOD AND APPARATUS FOR FORKING CURD

Edward C. Damrow, Fond du Lac, Wis.

Application May 14, 1935, Serial No. 21,468

6 Claims. (Cl. 31—48)

This invention relates to a method and an apparatus for forking curd in the art of cheese manufacture.

In the art of making cheese, the most back-breaking part of the process is the forking of the milled curd. This step of the process requires an hour, more or less, of continuously lifting and turning over the milled curd to permit the escape of gas and whey.

Heretofore, this step has usually been performed by two persons, located on opposite sides of the curd vat, each of them using an especially constructed fork, broader than a common pitchfork, but having many more tines, sufficiently close together to engage the milled curd in the vat similarly to the scooping action of a shovel.

If the step of forking is slighted, that is, stopped before all the gas has escaped and all the whey has drained away, cheese of inferior quality results.

Owing to the arduous work involved, the workmen are inclined to do just as little forking as is absolutely necessary.

The trouble has always been that, in many cases, the workmen misjudge the condition of the curd and stop forking before this step of the process has been adequately performed. The result is an inferior quality of cheese, sometimes wholly unsalable; in any event not up to the manufacturer's standard of quality, and greatly injuring his business because of dissatisfied customers.

To overcome these disadvantages, I have invented an apparatus whereby the forking of the curd is performed automatically, wholly by machinery, much more efficiently, and for as long a time as may be desired, without any manual labor whatever.

In my patent for Curd agitator, 1,611,854, granted December 21, 1926; and in my patent for Reversing mechanism for curd agitators and the like, 1,831,785, granted November 10, 1931; I show suitable machines to which my curd forker may be attached for operation.

In the drawings accompanying and made a part of this specification, I have shown only as much of the operating mechanisms of the patents mentioned above as is necessary to explain the use and the operation of my curd forking device.

In these drawings:

Figure 1 is a plan view of the carrier or truck with my curd forking machine in position thereon;

Fig. 2 is an elevation showing the curd forker in operative position;

Fig. 3 is a plan view of a forker blade;

Fig. 4 is a side view of a forker blade;

Fig. 5 is a rear end view of a forker blade.

Fig. 6 is a sectional view taken vertically through the head A to show the adjustability of head A along shaft 7.

It will be observed that I have used figures for reference wherever referring to elements of general application contained in my Patents 1,611,854 and 1,831,785 previously mentioned, and when referring to elements which constitute part of my present invention I have used letters for reference.

Elements I are a pair of overhead tracks upon which a truck 2 is caused to travel forwardly and backwardly by a chain 3 which is actuated by a motor 4 through suitable reduction gearing 5 and the direction of travel is reversed as desired by tripping lugs 9 detachably and adjustably located on tracks I. Shaft 7 is rotated continuously in the same direction while truck 2 upon which it is mounted travels back and forth. All this mechanism is explained in detail in my Patents 1,611,854 and 1,831,785 heretofore referred to; being referred to in this specification merely to illustrate types of motor-driven means suitable for operating the present invention.

My curd forker, or plow, the subject of the present invention, consists of arms B, carried by a head A which is detachably and adjustably mounted by a frictional fit or other common means of adjustment upon vertical rotating shaft 7. In plan view, as illustrated, arms B present practically the shape of a swastika (but this appearance is not an essential). Arms B carry at their lower ends blades, shovels, plows or forks C. Elements C are loosely and swingingly mounted on pivots or pintles D carried by socket members E. Socket members E have, preferably, a frictional fit upon arms B, as best shown at F in Fig. 4; but other well known means of adjustably connecting elements B and E may be employed.

Element C is of greater length than width and the greater portion thereof extends forwardly from its pivot D and, by reason of its weight and its looseness upon pivot D, the forward end is gravitationally in contact with the bottom of the cheese vat and, while in operation, passes between the upper surface of the bottom of the vat and the curd therein, and plows, forks or shovels the whole body of the curd in curvilinear lines as it progresses back and forth from end to end of the vat.

I prefer to make element C shallow V-shape in cross section as shown at G. This strengthens the blade or fork, causes a minimum of surface to contact with the bottom of the vat and makes it easier to plough under and through the curd.

Socket members E could be dispensed with, and blades C could be attached directly to arms B by pintles D passing transversely through the ends of arms B; but in such a construction all angular adjustment of blades C would have to be made by bending or twisting arms B.

All parts of the machine which come in contact with the curd should be composed of non-corrodible material or they should be so treated as to be non-corrodible.

It will be observed that, as the blades travel in a circular or curved path from side to side of the vat, the forward end of the blade, (which is always in contact with the bottom of the vat), passes under the milled curd, (almost contacting the sides of the vat), and ploughs it away from the bottom and the sides of the vat; further progress of the blade lifts the curd bodily, after which the curd rolls off and away from both sides of the curved line of travel of the blade, and, almost immediately the curd is again ploughed up and turned over by a succeeding fork. This bodily lifting from the bottom and turning over continuously occurs as long as the machine is permitted to run.

It is apparent that the forking done by this machine is much more thorough, regular, and continuous than any it is possible for the best workmen to do; no curd is skipped, and, consequently, this step of the process of making cheese does not take as much time, when this machine is used, as it takes when this step is manually performed; besides a more uniform cheese is produced when my forking machine is used.

The operation of the machine is as follows: Head A upon which arms B carrying forks C are detachably and adjustably mounted, is put in constant rotation and also caused to travel back and forth from end to end of the vat by the mechanism fully explained in my Patents 1,611,854 and 1,831,785 or by any other known mechanism which will produce the simultaneous rotation, and reciprocating travel necessary to the proper functioning of my forking device. As arms B revolve, forks C pass so close to the side walls of the vat that all the curd is acted upon by them; and, as head A carrying the revolving arms B is given a longitudinal travel, forwardly and then backwardly, from end to end of the vat, or through any portion of the vat desired, simultaneously with the revolutions of arms B, the result is that every particle of the curd is lifted and turned over many times as long as desired without any manual labor whatever.

Having thus fully explained my invention and the best mode of practicing it now known to me, what I claim is:

1. In cheese making the method of forking milled curd in a vat which consists in freeing the milled curd from the bottom of a vat, lifting the freed curd bodily, and turning it over in spirally winding lines progressively from end to end of the vat.

2. A method of forking curd in a vat which consists in passing a forking device under and through the curd and lifting the curd from the floor of the vat and turning the curd over in curvilinear overlapping paths progressively from end to end and from side to side of the vat.

3. In a curd forking device for cheese making a loosely pivoted forking blade gravitationally in contact at its free end with the floor of a curd vat for plowing under and through the curd in the vat, and means for carrying and driving the forking blade under and through the curd in curvilinear overlapping lines from end to end of the curd vat in which it is operated.

4. In the cheese making art means for forking milled curd in a curd vat comprising a rotatable vertical shaft, a vertically adjustable head on the shaft, a plurality of downwardly extending arms carried by the head, a pivoted forking blade carried by each arm for scooping up and turning over milled curd in a curd vat when the shaft is rotated and means for rotating the shaft.

5. In cheese making apparatus for forking milled curd the combination of a rotary head, a plurality of downwardly diverging arms carried by the head, a loosely pivoted forking blade located upon the lower end of each arm, means for rotating the head and for simultaneously causing the head, the arms and the loosely pivoted blades on the arms to travel to and fro longitudinally of a curd containing vat, whereby the loosely pivoted forking blades have light gravitational contact with the bottom of the vat and plow up and turn over the curd in the vat with which it is used.

6. In a curd forking device the combination of a vertically disposed shaft and means to rotate the shaft, of a cross head supported on the shaft, a plurality of downwardly diverging arms supported on the cross head, a socket member carried by the free end of each arm, means for frictionally connecting each socket member with an arm, a pintle carried by each socket member, and a shovel member located loosely upon each pintle, whereby the free end of each shovel member drops gravitationally and moves in light gravitational contact with the bottom of the curd vat in which it is operated.

EDWARD C. DAMROW.